US012771472B2

(12) United States Patent
Lee et al.

(10) Patent No.: US 12,771,472 B2
(45) Date of Patent: Oct. 20, 2026

(54) JAMMING SIGNAL GENERATION METHOD AND SYSTEM

(71) Applicant: AGENCY FOR DEFENSE DEVELOPMENT, Daejeon (KR)

(72) Inventors: Haemin Lee, Daejeon (KR); Kiwan Kim, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 230 days.

(21) Appl. No.: 18/884,119

(22) Filed: Sep. 13, 2024

(65) Prior Publication Data

US 2025/0125897 A1 Apr. 17, 2025

(30) Foreign Application Priority Data

Oct. 11, 2023 (KR) ........................ 10-2023-0135165

(51) Int. Cl.
*H04K 3/00* (2006.01)
*G01S 13/90* (2006.01)

(52) U.S. Cl.
CPC ................ *H04K 3/60* (2013.01); *G01S 13/90* (2013.01)

(58) Field of Classification Search
CPC ........ H04K 3/60; G01S 13/90; G01S 13/9027
See application file for complete search history.

(56) References Cited

U.S. PATENT DOCUMENTS 10,574,383 B1 * 2/2020 Lee ........................ H04K 3/224

FOREIGN PATENT DOCUMENTS

| | | |
|---|---|---|
| KR | 20140078245 | 6/2014 |
| KR | 101785841 | 10/2017 |
| KR | 101967886 | 4/2019 |
| KR | 20220029112 | 3/2022 |
| KR | 102546292 | 6/2023 |

(Continued)

OTHER PUBLICATIONS

Haemin Lee et al., "Effective Barrage Noise Jamming for Spotlight SAR Using Extended Kalman Filter-Based Kinematic Parameter Estimation", IEEE Journal of Selected Topics in Applied Earth Observations and Remote Sensing, vol. 16, Jul. 12, 2023, pp. 6579-6600.

(Continued)

*Primary Examiner* — Ankur Jain
(74) *Attorney, Agent, or Firm* — Ladas & Parry, LLP

(57) ABSTRACT

Provided are a jamming signal generation method and system. The method includes receiving a synthetic aperture radar (SAR) transmission signal by an SAR, determining a first form and position of a noise patch in a predefined coordinate system, transforming the predefined coordinate system into an SAR image formation plane (IFP) coordinate system, based on a coordinate system transformation function, determining a second form and position transformed from the first form and position of the noise patch in an SAR image using the SAR IFP coordinate system, generating a first reflectivity map model, based on the second form and position of the noise patch, generating a second reflectivity map model by performing two-dimensional fast Fourier transformation on the first reflectivity map model, and generating an SAR jamming signal based on a convolutional product of the second reflectivity map model and a reference signal.

13 Claims, 9 Drawing Sheets

(56) References Cited

FOREIGN PATENT DOCUMENTS

| | | |
|---|---|---|
| KR | 102578269 | 9/2023 |
| KR | 20230140094 | 10/2023 |

OTHER PUBLICATIONS

"Written Decision on Registration of Korea Counterpart Application", issued on Jan. 29, 2024, with English translation thereof, pp. 1-11.

* cited by examiner

JAMMING SIGNAL GENERATION METHOD AND SYSTEM

CROSS-REFERENCE TO RELATED APPLICATION

This application is based on and claims priority under 35 U.S.C. § 119 to Korean Patent Application No. 10-2023-0135165, filed on Oct. 11, 2023, in the Korean Intellectual Property Office, the disclosure of which is incorporated by reference herein in its entirety.

BACKGROUND

1. Field

The disclosure relates to a jamming signal generation method and system, and more particularly, to a jamming signal generation method and system in which a noise patch in an arbitrary form is generated in a synthetic aperture radar (SAR) image.

2. Description of the Related Art

Generally, a synthetic aperture radar (SAR) jamming method is classified into noise jamming, barrage jamming, and deceptive jamming. Noise jamming is a jamming method which transmits electric waves in a broadband random noise waveform through an SAR to obscure a main target by noise in an SAR image. Noise jamming is simply applicable, but various techniques for restoring an image damaged by noise jamming have been developed and noise jamming requires higher transmission power than deceptive jamming. Deceptive jamming is a method that detects an SAR transmission signal, applies simple modulation to the SAR transmission signal, and retransmits the SAR transmission signal, and may generate a false target in an SAR image. In deceptive jamming, a jamming signal uses an intact SAR transmission waveform and thus may obtain an intact SAR signal processing gain, such that a false target may be generated merely with lower power than noise jamming. However, for precise focusing of a false target, it is necessary to accurately estimate not only the current position of an SAR transmission antenna, but also a future position thereof, and much computation is required to generate a plurality of or consecutive false targets.

SUMMARY

Provided is a jamming signal generation method in which a noise patch in an arbitrary form is generated in a synthetic aperture radar (SAR) image.

According to an aspect of the disclosure, a jamming signal generation method includes receiving a synthetic aperture radar (SAR) transmission signal collected by an SAR device for a target area, calculating a parameter including an angle of arrival (AOA) of the SAR transmission signal, based on the SAR transmission signal, determining a first form and a first position of a noise patch in a predefined coordinate system, transforming the predefined coordinate system into an SAR image formation plane (IFP) coordinate system, based on a coordinate system transformation function, determining a second form and a second position transformed from the first form and the first position of the noise patch in an SAR image generated based on the SAR transmission signal using the SAR IFP coordinate system, generating a first reflectivity map model, based on the second form and the second position of the noise patch, generating a second reflectivity map model of a frequency domain by performing two-dimensional (2D) fast Fourier transformation (FFT) on the first reflectivity map model, and generating an SAR jamming signal, based on a convolutional product of the second reflectivity map model and a reference signal.

According to an example, the jamming signal generation method may further include performing inverse FFT (IFFT) on the SAR jamming signal and transmitting the SAR jamming signal to the target area to generate the noise patch in the SAR image.

According to another example, the determining of the first form and the first position of the noise patch in the predefined coordinate system may include determining the first form and the first position of the noise patch by using coordinates of a corner of the noise patch in a north-east coordinate system.

According to another example, the coordinate system transformation function indicated as $C^{I_N}$ may include a direction cosine matrix that transforms the noise patch from the first form and the first position in the north-east coordinate system to the second form and the second position in the SAR IFR coordinate system, and may be defined as Image, in which Cambria Math indicates a rotation angle of the SAR IFP coordinate system based on the north-east coordinate system, and is calculated based on an angle of arrival (AOA) of the SAR transmission signal.

According to another example, coordinates of the second position of the noise patch in the SAR IFP coordinate system may be calculated using Image, in which $x^N$ and $y^N$ respectively indicate x-direction and y-direction coordinates of a corner of the noise patch in the north-east coordinate system, and $x^I$ and $y^I$ may respectively indicate x-direction and y-direction coordinates of the corner of the noise patch in the SAR IFP coordinate system.

According to another example, the second reflectivity map model indicated as V(n, f) may be calculated according to $V(n, f)=F\{a(x^I, y^I)\}$, in which n indicates a pulse index of the second reflectivity map model, f indicates a pulse frequency of the second reflectivity map model, F(A) indicates a function that performs 2D FFT on A, and $a(x^I, y^I)$ indicates the first reflectivity map model.

According to another example, the SAR jamming signal indicated as S(n, f) may include a convolutional product of the second reflectivity map model and the reference signal, and may be calculated according to $S(n, f)=U(n, f)V(n, f)$, in which U(n, f) indicates the reference signal and includes a waveform of an SAR signal in a frequency domain.

According to another example, the parameter may further include a center frequency of the SAR transmission signal, a transmission bandwidth of the SAR transmission signal, and a pulse repetition frequency of the SAR transmission signal.

According to another aspect of the disclosure, a computer program is stored on a recording medium to execute, on a computing device, the jamming signal generation method described above.

According to another aspect of the disclosure, a jamming signal generation system includes a noise patch configuration unit and a synthetic aperture radar (SAR) signal generation unit, in which the noise patch configuration unit includes an SAR signal reception unit configured to receive an SAR transmission signal collected by an SAR device for a target area, a first determination unit configured to determine a first form and a first position of a noise patch in a predefined coordinate system, a coordinate system transformation unit configured to transform the predefined coordinate system into an SAR image formation plane (IFP) coordinate system, based on a coordinate system transformation function, and a second determination unit configured to determine a second form and a second position transformed from the first form and the first position of the noise patch in an SAR image generated based on the SAR transmission signal using the SAR IFP coordinate system, and the SAR signal generation unit includes a first reflectivity map model generation unit configured to generate a first reflectivity map model based on the second form and the second position of the noise patch, a second reflectivity map model generation unit configured to generate a second reflectivity map model of a frequency domain by performing two-dimensional (2D) fast Fourier transformation (FFT) on the first reflectivity map model, and an SAR jamming signal generation unit configured to generate an SAR jamming signal based on a convolutional product of the second reflectivity map model and a reference signal.

According to an example, the jamming signal generation system may further include a noise patch generation unit configured to perform inverse FFT (IFFT) on the SAR jamming signal and transmit the SAR jamming signal to the target area to generate the noise patch in the SAR image.

According to another example, the first determination unit may be further configured to determine the first form and the first position of the noise patch by using coordinates of a corner of the noise patch in a north-east coordinate system.

According to another example, the noise patch configuration unit may further include a parameter calculation unit configured to calculate a parameter including an angle of arrival (AOA) of the SAR transmission signal based on the SAR transmission signal.

The advantages and/or features of the disclosure and how to achieve them will be apparent with reference to the embodiments and drawings below.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
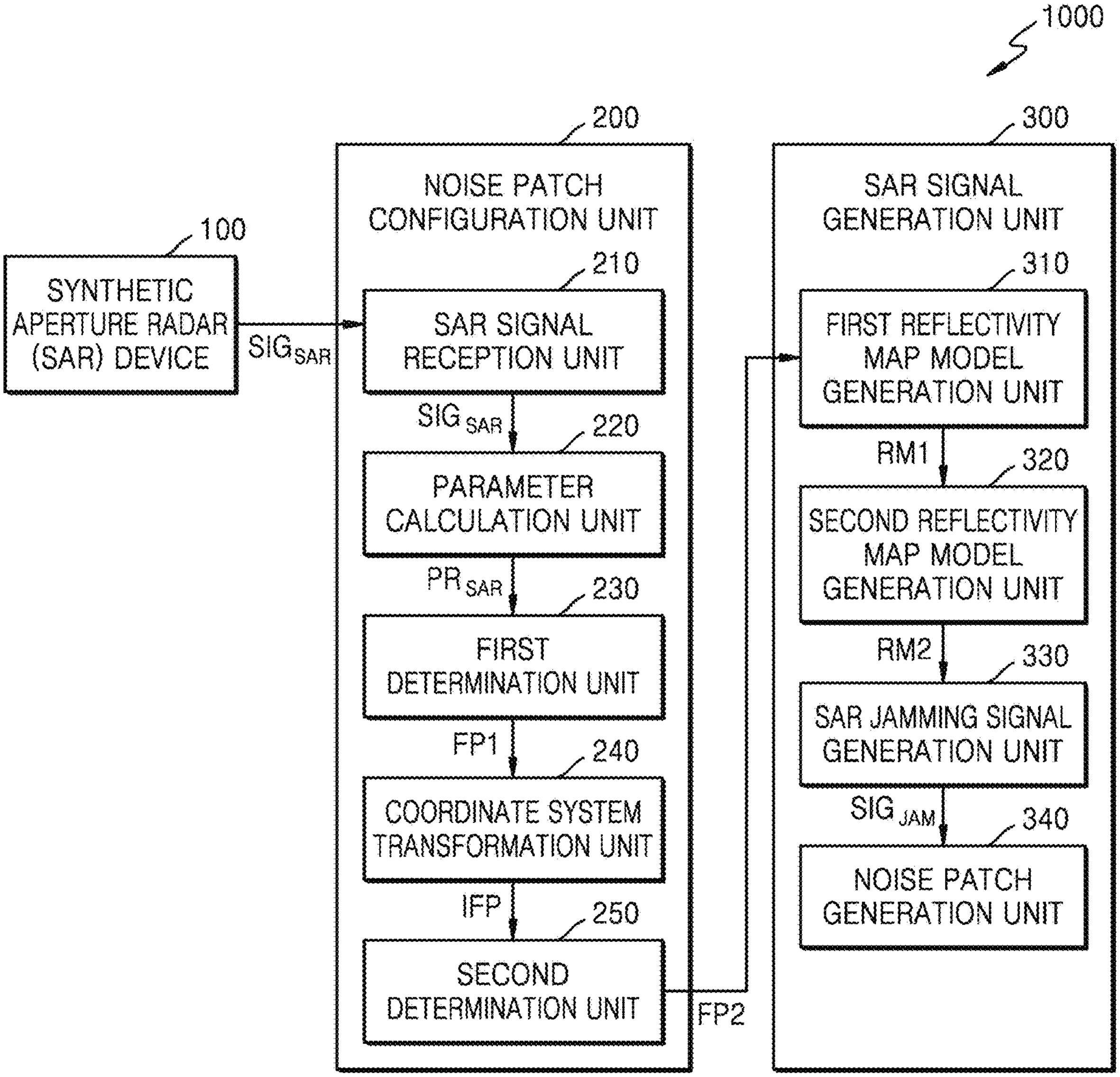
FIG. 1 is a block diagram schematically showing a jamming signal generation system according to the disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments will be described in detail with reference to the accompanying drawings.

Before a detailed description of the disclosure, some terms or words used herein should not be construed unconditionally and limitedly to their usual or dictionary meanings, and the inventor of the disclosure may appropriately define a concept of the term to describe the invention thereof in the best way. Moreover, it should be noted that those terms or words are interpreted with a meaning and a concept consistent with the technical spirit of the disclosure. That is, the terms used herein are merely used to describe an embodiment, and are not used to limit the matter of the disclosure in detail. It should be noted that the terms are defined in consideration of various possibilities of the disclosure.

Herein, singular expressions may include plural expressions unless indicated otherwise in the context. Similarly, it is important to note that even if expressed in the plural, it may have a singular meaning.

Throughout the specification, when a component is "connected" to another component, it may include not only a case where they are "directly connected", but also a case where they are "indirectly connected" with another component therebetween. When a component is referred to as "includes" another component, it may mean that the component may further include still another component rather than excluding the still another component unless stated otherwise.

The terms "first", "second", etc., used in the specification, claims, and drawings of the disclosure are intended to distinguish similar objects and are not intended to indicate a specific order or sequential order.

Moreover, in the specification of the disclosure, terms such as " . . . unit", " . . . or/er", "module", "device", etc., when used, mean a unit capable of processing one or more functions or operations. It should be noted that this may be implemented in hardware or software, or a combination of hardware and software.

Hereinafter, in describing the disclosure, a detailed descriptions of known techniques, including configurations that may unnecessarily obscure the subject matter of the disclosure, for example, prior art, may be omitted.

FIG. 1 is a block diagram schematically showing a jamming signal generation system according to the disclosure.

Referring to FIG. 1, in a jamming signal generation system 1000, for a system including an electronic support (ES) function in a jamming system, a signal generation process for jamming may start as the ES function detects a synthetic aperture radar (SAR) transmission signal. After the ES function detects the SAR transmission signal, an SAR jamming signal $SIG_{JAM}$ may be transmitted after estimating a parameter, generating reflectivity maps RM1 and RM2, and generating the SAR jamming signal $SIG_{JAM}$.

The jamming signal generation system 1000 may include a noise patch configuration unit 200 and an SAR signal generation unit 300. The jamming signal generation system 1000 may further include an SAR device 100.

The SAR device 100 may collect an SAR transmission signal $SIG_{SAR}$ for a target area. The SAR device 100 may transmit the SAR transmission signal $SIG_{SAR}$ to an SAR signal reception unit 210.

The noise patch configuration unit 200 may determine a form and a position of the noise patch, which are bases for jamming signal generation, in an SAR image formation plane (IFP) coordinate system. The noise patch configuration unit 200 may include the SAR signal reception unit 210, a parameter calculation unit 220, a first determination unit 230, a coordinate system transformation unit 240, and a second determination unit 250.

The SAR signal reception unit 210 may receive the SAR transmission signal $SIG_{SAR}$ from the SAR device 100. The SAR signal reception unit 210 may transmit the SAR transmission signal $SIG_{SAR}$ to the parameter calculation unit 220.

The parameter calculation unit 220 may calculate a parameter $PR_{SAR}$ including an angle of arrival (AOA) of the SAR transmission signal $SIG_{SAR}$ based on the SAR transmission signal $SIG_{SAR}$. The parameter calculation unit 220 may calculate and pre-store a parameter $PR_{SAR}$ further including a center frequency, a transmission bandwidth, and a pulse repetition frequency of the SAR transmission signal $SIG_{SAR}$. The parameter calculation unit 220 may transmit the parameter $PR_{SAR}$, together with the SAR transmission signal $SIG_{SAR}$, to the first determination unit 230.

The first determination unit 230 may determine first form and position FP1 of a noise patch in a predefined coordinate system. For example, the first determination unit 230 may determine the first form and position FP1 of the noise patch by using coordinates of a corner of the noise patch in a north-east coordinate system. The first determination unit 230 *ay* transmit data regarding the first form and position FP1 of the noise patch to the coordinate system transformation unit 240.

The coordinate system transformation unit 240 may transform the predefined coordinate system into an SAR IFP coordinate system based on the coordinate system transformation function. The predefined coordinate system may be a north-east coordinate system. The coordinate system transformation unit 240 may transmit data regarding an SAR IFP coordinate system, together with data regarding the first form and position FP1 of the noise patch, transmitted from the first determination unit 230, to the second determination unit 250.

The second determination unit 250 may determine a second form/position FP2, transformed from the first form and position FP1 of the noise patch, in the SAR image by using the SAR IFP coordinate system.

The SAR signal generation unit 300 may receive the configured noise patch from the noise patch configuration unit 200 and generate the SAR jamming signal $SIG_{JAM}$ for jamming to generate the noise patch in the SAR image.

The SAR signal generation unit 300 may include a first reflectivity map model generation unit 310, a second reflectivity map model generation unit 320, an SAR jamming signal generation unit 330, and a noise patch generation unit 340.

The first reflectivity map model generation unit 310 may generate a first reflectivity map model RM1 based on the second form and position FP2 of the noise patch. For example, the first reflectivity map model RM1 may be generated by filling the inside of a polygonal formed by coordinates of the second form and position FP2 of the noise patch with noise having an arbitrary distribution. The first reflectivity map model generation unit 310 may transmit the first reflectivity map model RM1 to the second reflectivity map model generation unit 320.

The second reflectivity map model generation unit 320 may perform two-dimensional (2D) fast Fourier transform (FFT) on the first reflectivity map model RM1 to generate the second reflectivity map model RM2 of a frequency domain. The second reflectivity map model V(n, f) may be calculated according to $V(n, f)=F\{a(xl, yl)\}$. Herein, n may indicate a pulse index of the second reflectivity map model RM2, f may indicate a pulse frequency of the second reflectivity map model RM2, F(A) may indicate a function that performs 2D FFT on A, and $a(x^l, y^l)$ may indicate the first reflectivity map model RM1. The second reflectivity map model generation unit 320 may transmit the second reflectivity map model RM2 to the SAR jamming signal generation unit 330.

The SAR jamming signal generation unit 330 may generate the SAR jamming signal $SIG_{JAM}$ based on a convolutional product of the second reflectivity map model RM2 and a reference signal. As a convolutional product of two signals may be expressed as a product in the frequency domain, the SAR jamming signal $SIG_{JAM}$ may be calculated as a convolutional product of the second reflectivity map model RM2 and the reference signal. According to an example, the SAR jamming signal (S(n, f)) may be a convolutional product of the second reflectivity map model RM2 and the reference signal, and may be calculated according to $S(n, f)=U(n, f)V(n, f)$. Herein, U(n, f) may be a reference signal and may be a waveform of an SAR signal in the frequency domain. The SAR jamming signal generation unit 330 may transmit the SAR jamming signal $SIG_{JAM}$ and transmit the same to the noise patch generation unit 340.

The noise patch generation unit 340 may perform inverse FFT (IFFT) on the SAR jamming signal $SIG_{JAM}$ and transmit the same to a target area to generate a noise patch in the SAR image.

Figure 2:
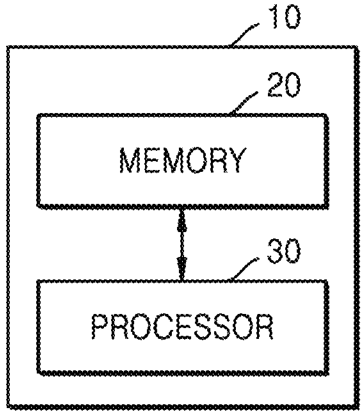
FIG. 2 is a block diagram schematically showing a computing device for executing a jamming signal generation method, according to an embodiment.

FIG. 2 is a block diagram schematically showing a computing device for executing a jamming signal generation method, according to an embodiment.

Referring to FIG. 2, a computing device 10 may include a memory 20 and a processor 30.

The memory 20 may be a recording medium readably by the computing device 10 and include a permanent mass storage device such as random access memory (RAM), read only memory (ROM), and a disk drive.

The memory 20 may store a program code for executing a jamming signal generation method according to an embodiment, data required for executing the program code, and data generated in a process of executing the program code. The program code may include algorithm codes for 2D FFT, IFFT, and convolution operations. The program code may include an algorithm code for recalculating a coordinate system transformation function as a rotation angle of an SAR IFP coordinate system based on a predefined coordinate system changes.

The memory 20 may store data required for executing a jamming signal generation method according to the disclosure. For example, the memory 20 may store a parameter including a center frequency, a transmission bandwidth, and a pulse repetition frequency of an SAR transmission signal. The memory 20 may pre-store a reference signal for generating an SAR jamming signal. The memory 20 may store data regarding a coordinate system transformation function for coordinate-transformation from a predefined coordinate system to an SAR IFP coordinate system. The data regarding the coordinate system transformation function will be described in more detail with reference to FIG. 5. The memory 20 may store a predefined coordinate system required for executing the jamming signal generation method. For example, the memory 20 may store data regarding a north-east coordinate system and a local tangent plane coordinate system. The memory 20 may respectively store forms and positions before and after transformation of the noise patch in the predefined coordinate system and the SAR IFP coordinate system. For example, the memory 20 may store the form and the position of the noise patch based on corner and boundary coordinates.

The processor 30 may generally control an overall operation of the computing device 10. The processor 30 may be configured to process a command of a computer program by performing basic arithmetic, logic, and input/output operations. The processor 30 may generate an SAR jamming signal to generate the noise patch in the SAR image based on the coordinate system transformation function and predefined form and position of the noise patch. The processor 30 may receive data stored in the memory 20 and transmit the data to the memory 20.

According to an embodiment, the computing device 10 may further include a communication module, an input/output device, a storage device, etc., as well as the memory 20 and the processor 30. For example, the computing device 10 may transmit the SAR transmission signal from the SAR device through the communication module.

A detailed description of an operation of the processor 30 according to various embodiments will be made below.

Figure 3:
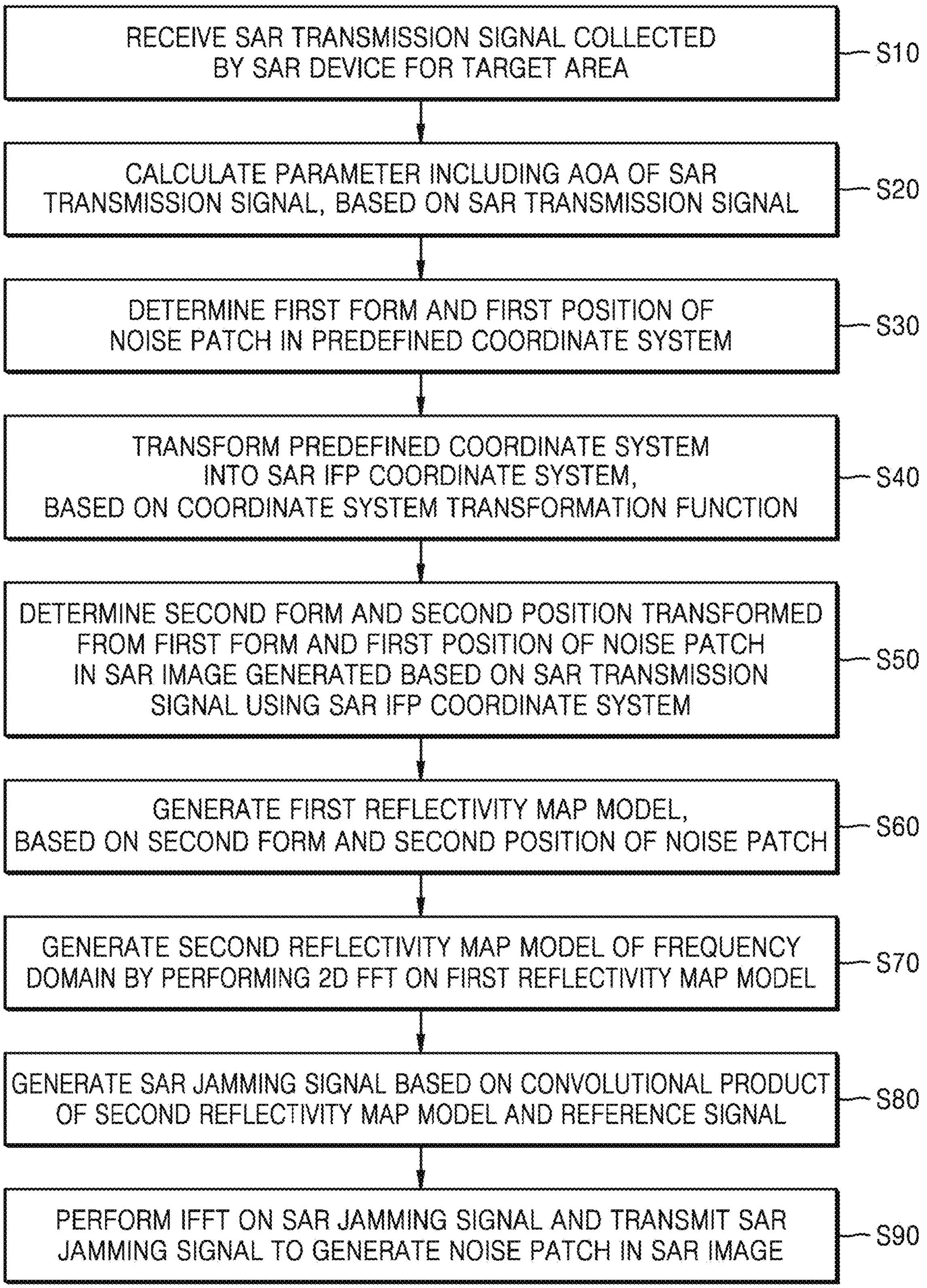
FIG. 3 is a flowchart for describing a jamming signal generation method according to the disclosure.

FIG. 3 is a flowchart for describing a jamming signal generation method according to the disclosure.

Referring to FIG. 3, a jamming signal generation process is shown in which jamming is performed on a specific target by generating a noise patch defined in an SAR IFP coordinate system in an SAR image of a target area.

The jamming signal generation method according to the disclosure may be performed by the processor 30 of FIG. 2. The disclosure may be targeted at a system having an electronic support (ES) function in the jamming system. As the system having the ES function detects an SAR transmission signal, the jamming signal generation method for jamming may start.

The SAR transmission signal collected by the SAR device for the target area may be received, in operation S10. The SAR transmission signal may be a signal including a target in the target area to be obscured based on the jamming signal generated according to the disclosure.

A parameter including an angle of arrival (AOA) of the SAR transmission signal may be calculated based on the SAR transmission signal, in operation S20. The parameter may be a value required for jamming signal generation, and may be prestored in the memory 20 of FIG. 2. The parameter estimation may be performed in the ES included in the system. For example, the parameter may include a center frequency of the SAR transmission signal, a transmission bandwidth of the SAR transmission signal, an angle of arrival (AOA) of the SAR signal, and a pulse repetition frequency of the SAR transmission signal.

In the predefined coordinate system, the first form and position of the noise patch may be determined, in operation S30. The predefined coordinate system may be a user-defined coordinate system, e.g., a north-east coordinate system. For example, the first form and position of the noise patch may be determined based on coordinates of a corner of the noise patch in the north-east coordinate system.

The predefined coordinate system may be transformed into an SAR IFP coordinate system based on the coordinate system transformation function, in operation S40. The SAR IFR coordinate system may be a virtual plane used for a radar system to collect a reflected signal from a target or ground surface and generate an image. The SAR IFP coordinate system may be a coordinate system for generating a noise patch having user-desired form and position in an SAR image. According to an example, the coordinate system transformation function $C^{I_N}$ may be a direction cosine matrix that transforms the noise patch from the first form and position in the north-east coordinate system to the second form and position in the SAR IFR coordinate system. The coordinate system transformation function $C^{I_N}$ may be defined as $$C^{I_N} = \begin{bmatrix} \cos\theta^{I_N} & -\sin\theta^{I_N} \\ \sin\theta^{I_N} & \cos\theta^{I_N} \end{bmatrix}.$$

Herein, Cambria Math may indicate a rotation angle of an SAR IFP coordinate system based on the north-east coordinate system and may be calculated based on the AOA of the SAR transmission signal. Operation S40 will be described in more detail with reference to FIG. 5.

In operation S50, the second form and position transformed from the first form and position of the noise patch may be determined in the SAR image generated based on the SAR transmission signal using the SAR IFP coordinate system. The coordinates of the second position in the noise patch in the SAR IFP coordinate system may be calculated using $[x^I\ y^I]^T = C^{I_N}[x^N\ y^N]^T$. Herein, $(x^N, y^N)$ may respectively indicate x-direction and y-direction coordinates of a corner of the noise patch in the north-east coordinate system, and $x^I$ and $y^I$ may respectively indicate x-direction and y-direction coordinates of the corner of the noise patch in the SAR IFP coordinate system.

A first reflectivity map model may be generated based on the second form and position of the noise patch, in operation S60. For example, the first reflectivity map model may be generated by filling the inside of a polygonal formed by coordinates of the second form and position of the noise patch with noise having an arbitrary distribution.

The second reflectivity map model in the frequency domain may be generated by performing 2D FFT on the first reflectivity map model, in operation S70. The second reflectivity map model V(n, f) may be calculated according to V(n, f)=F{a(xl, yl)}. Herein, n may indicate a pulse index of the second reflectivity map model, f may indicate a pulse frequency of the second reflectivity map model, F(A) may indicate a function that performs 2D FFT on A, and $a(x^I, y^I)$ may indicate the first reflectivity map model. The reflectivity map model may be generated by filling an inner area of the noise patch with complex noise.

An SAR jamming signal may be generated based on a convolutional product of the second reflectivity map model and the reference signal, in operation S80. The SAR jamming signal S(n, f) may be calculated according to a convolutional product of the second reflectivity map model and the reference signal. According to an example, the SAR jamming signal S(n, f) may be calculated based on S(n, f)=U(n, f)V(n, f). Herein, U(n, f) may be a reference signal and may be a waveform of an SAR signal in the frequency domain. The reference signal may be data stored in advance in the memory 20 of FIG. 2.

The SAR jamming signal may be subject to IFFT and then transmitted to the target area to generate the noise patch in the SAR image, in operation S90. According to an example, by performing IFFT on the SAR jamming signal in the frequency domain, the SAR jamming signal in a time domain may be calculated.

Figure 4:
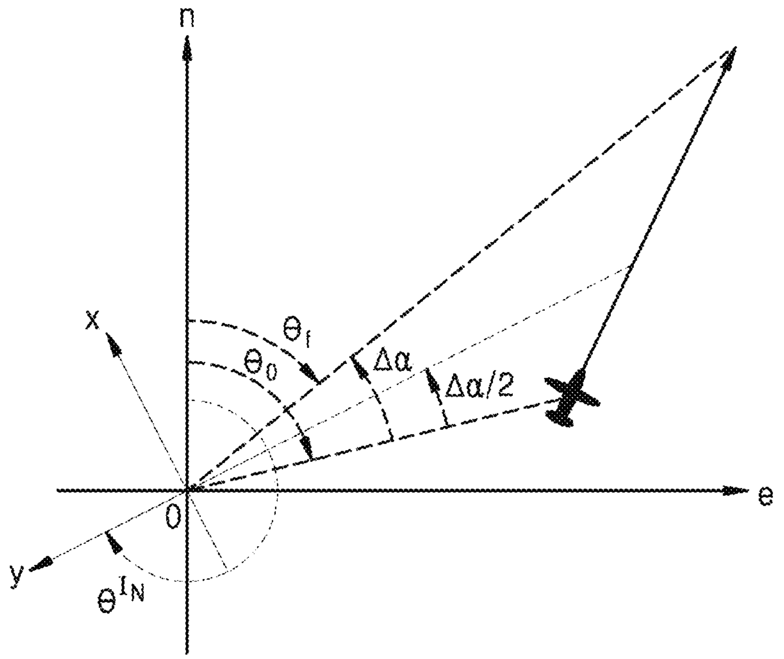
FIG. 4 shows a rotation angle in a coordinate system transformation function, according to an embodiment.

FIG. 4 shows a rotation angle in a coordinate system transformation function, according to an embodiment.

Referring to FIG. 4, a rotation angle for coordinate transformation of a noise patch from a predefined coordinate system to an SAR IFP coordinate system according to the disclosure is shown.

To generate a noise patch similar to noise having arbitrary form and position in an SAR image, coordinates of a peak and a boundary of a noise patch defined in an SAR IFP coordinate system are required. Before a jamming signal generation method according to the disclosure is performed, coordinates in the SAR IFP system are not defined, such that initial coordinates of the noise patch may be defined in a predefined coordinate system (e.g., the north-east coordinate system) before reception of an SAR pulse. To generate a reflectivity map, coordinate transformation from coordinates in the predefined coordinate system to coordinates of the SAR IFP coordinate system has to be performed. For example, the predefined coordinate system may be the north-east coordinate system. The predefined coordinate system may be a local tangent plane (LTP) coordinate system. The LTP coordinate system is one of geospatial coordinate systems used in aeronautical and astronautical exploration, and may be used to express coordinates by approximating the earth's space at a specific point into a plane. FIG. 4 illustrates coordinate transformation from an LTP coordinate system into an SAR IFP coordinate system as an example according to the disclosure, and a description will be made based thereon.

Referring to FIG. 4, a y axis in the SAR IFP coordinate system coincides with a vector to a coordinate center at a platform position, such that the rotation angle Cambria Math of the SAR IFP coordinate system with respect to the LTP coordinate system may be calculated according to Cambria Math=$(\theta_f+\theta_0)/2+\pi$. Herein, Of may indicate an azimuth AOA for a final platform position of an aircraft with respect to North n, and $\theta_0$ may indicate an azimuth AOA for a current platform position of the aircraft with respect to North n. For example, a jamming system may include an electronic counter measure (ECM) function and an electronic warfare support (ES) (function to measure an AOA for valid jamming.

In FIG. 4, a coordinate system transformation function may be calculated based on the calculated rotation angle Cambria Math of the SAR IFP coordinate system based on the north-east coordinate system. The coordinate system transformation function $C^{I_N}$ may be defined as $$C^I{}_N = \begin{bmatrix} \cos\theta^I{}_N & -\sin\theta^I{}_N \\ \sin\theta^I{}_N & \cos\theta^I{}_N \end{bmatrix}.$$

The transformed coordinates may be calculated by multiplying a coordinate system transformation function, expressed as a direction cosine matrix (DCM) based on a value of the rotation angle Cambria Math, by coordinates before transformation. An inner region of the transformed peak and boundary coordinates may be filled with complex noise, thereby generating a reflectivity map of FIG. 6.

Figure 5:
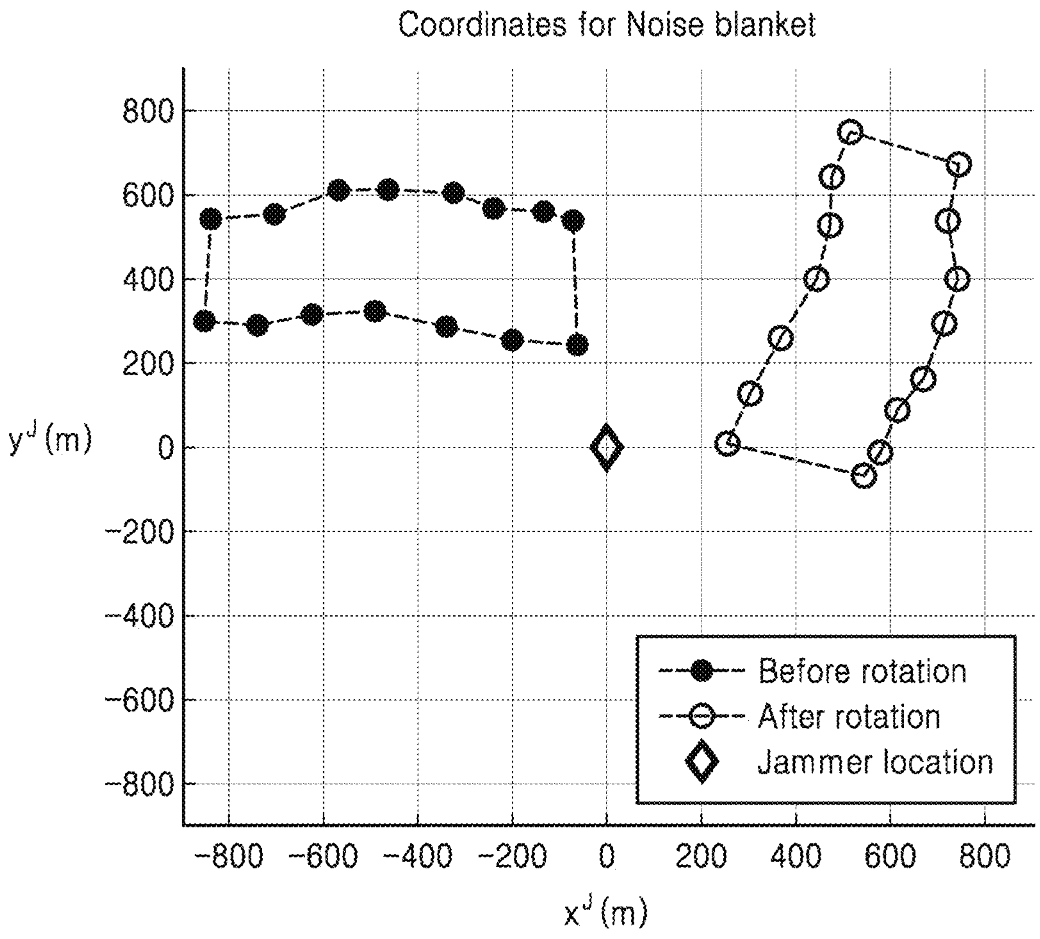
FIG. 5 illustrates an example of coordinate transformation of a noise patch, according to an embodiment.

FIG. 5 illustrates an example of coordinate transformation of a noise patch, according to an embodiment.

Referring to FIG. 5, an example is shown in which the noise patch is rotationally transformed from coordinates of a predefined coordinate system into coordinates of the SAR IFP coordinate system based on the rotation angle Cambria Math of the SAR IFP coordinate system based on the north-east coordinate system shown in FIG. 4. Referring to FIG. 4, an SAR image center may be an origin, and a jamming device may be located at the origin.

In the predefined coordinate system, the first form and position of the noise patch may be determined. According to an example, the predefined coordinate system may be the north-east coordinate system. The first form and position of the noise patch may be determined using coordinates of a corner of the noise patch in the north-east coordinate system. A form and a position of a noise patch corresponding to Before Rotation shown in FIG. 5 may be a first form and a first position of a noise patch in the north-east coordinate system.

The coordinate system transformation function $C^{I_N}$ may be a direction cosine matrix that transforms the noise patch from the first form and position in the north-east coordinate system to the second form and position in the SAR IFR coordinate system. According to an example, the coordinate system transformation function $C^{I_N}$ may be defined as $$C^I{}_N = \begin{bmatrix} \cos\theta^I{}_N & -\sin\theta^I{}_N \\ \sin\theta^I{}_N & \cos\theta^I{}_N \end{bmatrix}.$$

Herein, Cambria Math may indicate a rotation angle of an SAR IFP coordinate system based on the north-east coordinate system and may be calculated based on the AOA of the SAR transmission signal.

The coordinates of the second position in the noise patch in the SAR IFP coordinate system may be calculated using $[x^I\ y^I]^T=C^{I_N}\ [x^N\ y^N]^T$. Herein, $(x^N, y^N)$ may respectively indicate x-direction and y-direction coordinates of a corner of the noise patch in the north-east coordinate system, and $x^I$ and $y^I$ may respectively indicate x-direction and y-direction coordinates of the corner of the noise patch in the SAR IFP coordinate system. The second form and the second position of the noise patch may be determined using coordinates of a corner of the noise patch in the north-east coordinate system. A form and a position of a noise patch corresponding to After Rotation shown in FIG. 5 may be the second form and the second position of a noise patch in the SAR IFP coordinate system.

The second position of the noise patch may be a position after rotation from the first position of the noise patch by the rotation angle Cambria Math of the SAR IFP coordinate system based on the north-east coordinate system shown in FIG. 4. A noise patch may be generated based on the form and the position of the noise patch corresponding to After Rotation shown in FIG. 5. The reflectivity map of FIG. 6 may be generated based on the form and the position of the noise patch corresponding to After Rotation.

Figure 6:
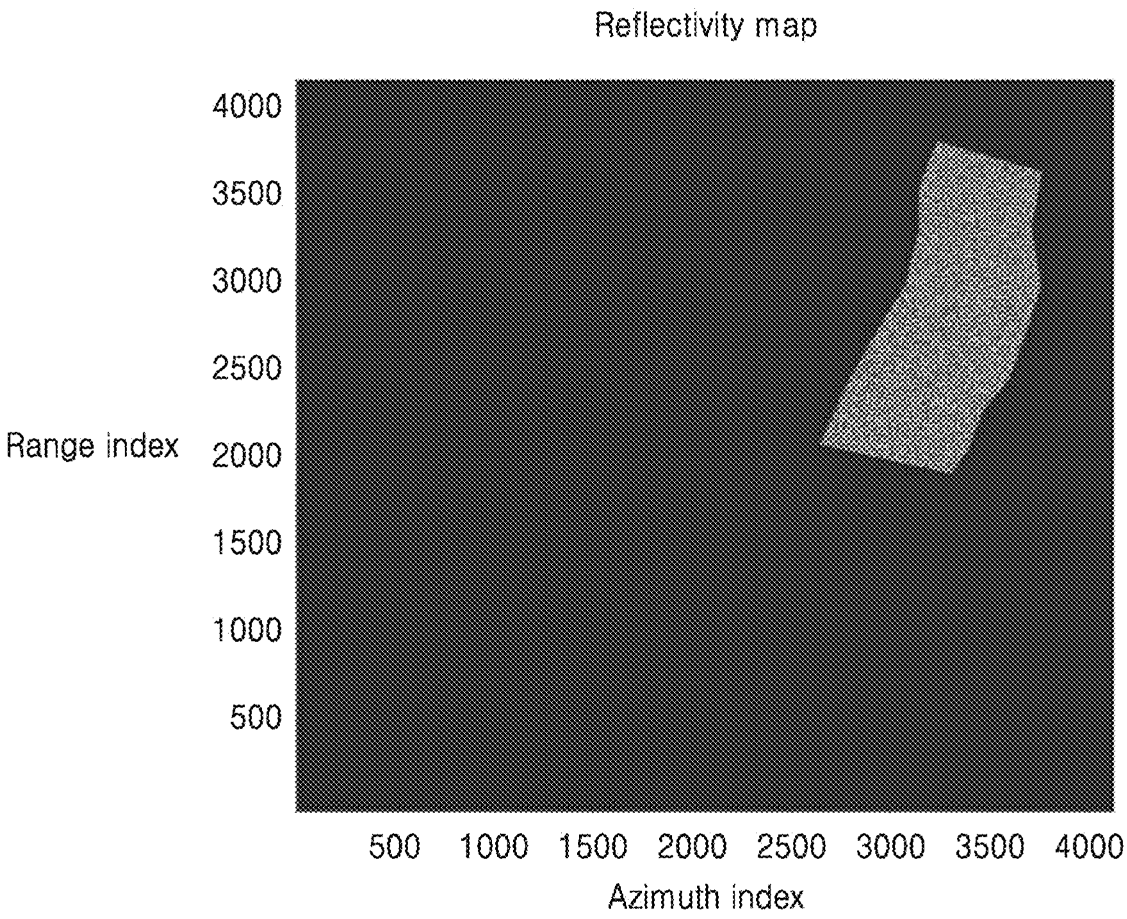
FIG. 6 illustrates an example of a reflectivity map, according to an embodiment.

FIG. 6 illustrates an example of a reflectivity map, according to an embodiment.

Referring to FIG. 6, the reflectivity map may be generated based on the noise patch with the coordinates rotationally transformed using the coordinate system transformation function in FIG. 5. An area expressed brightly in the reflectivity map of FIG. 6 may be a target to be obscured using a jamming method. The reflectivity map may determine a form and a position of a noise patch in an SAR image.

In the SAR system, the reflectivity map may be expressed in the form of image data, and reflective characteristics of the earth's space or a target may be visually indicated. In the reflectivity map of FIG. 6, a range axis and an azimuth axis may respectively indicate a vertical direction and a horizontal direction of data. For example, the range axis may be a distance axis and indicate the vertical direction of data in the reflectivity map. The azimuth axis may be an azimuth axis and indicate the horizontal direction of the data in the reflectivity map.

Figure 7:
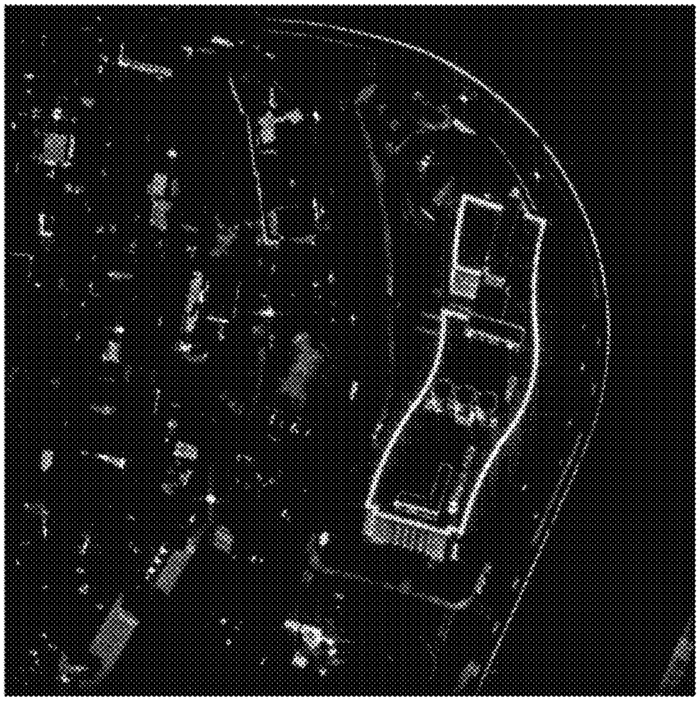
FIG. 7 illustrates an example of a general synthetic aperture radar (SAR) image without a jamming signal.
Figure 8:
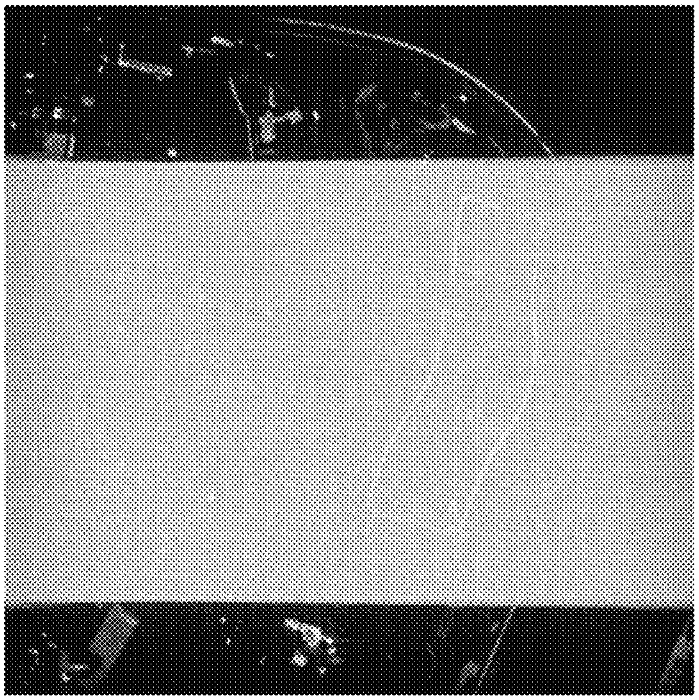
FIG. 8 illustrates an example of a general SAR image to which noise jamming is applied.
Figure 9:
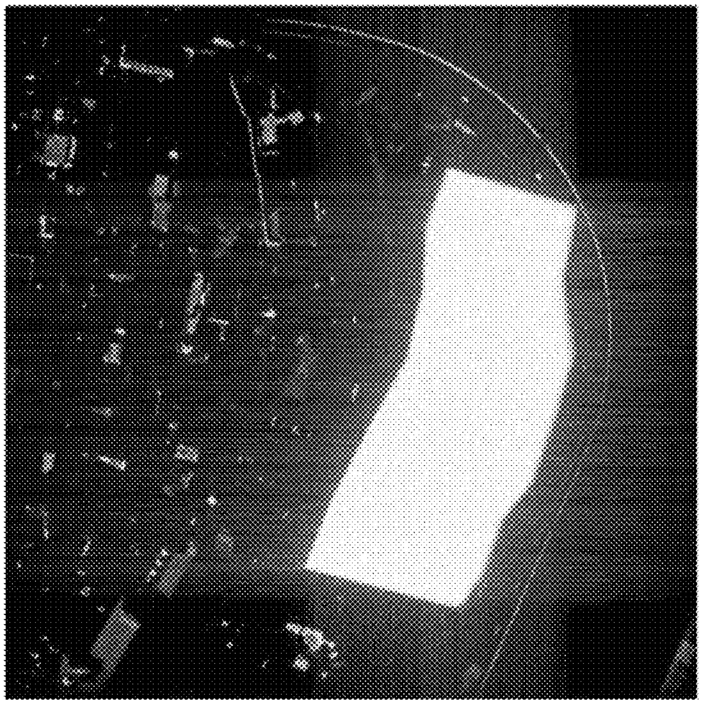
FIG. 9 illustrates an example of an SAR image to which a jamming signal is applied, according to an embodiment.

FIGS. 7 to 9 show an example when a general jamming method is applied to the SAR image of FIG. 7 and an example when a jamming method is applied using a jamming signal generated according to the disclosure.

FIG. 7 illustrates an example of a general SAR image without a jamming signal. According to an example, a building shown in FIG. 7 with the form and the position shown in FIG. 6 may be a target to be obscured using a jamming method in the SAR image.

FIG. 8 illustrates an example of a general SAR image to which noise jamming is applied. FIG. 8 shows an example in which noise jamming among SAR jamming methods is applied to an SAR image having no jamming signal of FIG. 7. It may be seen from FIG. 8 that a noise image according to general noise jamming fails to completely obscure a building in an SAR image.

FIG. 9 illustrates an example of an SAR image to which a jamming signal is applied, according to an embodiment. FIG. 9 shows an SAR image having applied thereto a jamming signal that selectively obscures a specific target (the building of FIG. 7) by generating the noise patch of FIG. 6 in the SAR image having no jamming signal of FIG. 7.

It may be seen from FIG. 9 that the noise patch is shown as a white area in FIG. 9 based on the form and the position shown in the reflectivity map of FIG. 6. It may be seen that the noise patch of FIG. 9 obscures the building in the SAR image unlike in FIG. 8. According to the disclosure, as a signal transmission power may be concentrated on a noise patch in an arbitrary form, the disclosure may be more efficient than an existing jamming method in terms of power.

So far, various embodiments have been described by giving some examples, but the description of the various embodiments described in the "Detailed Description" section is merely illustrative, and it would be well understood from the foregoing description by those of ordinary skill in the art that the disclosure may be implemented with various modifications or equivalents thereto.

In addition, since the disclosure may be implemented in various other forms, the disclosure is not limited by the foregoing description, and it should be noted that the foregoing description is provided to complete the disclosure and to perfectly inform those of ordinary skill in the art of the scope of the disclosure, and the disclosure is defined by the claims.

According to the disclosure, by generating a jamming signal for taking an SAR signal processing gain and concentrating jamming power to desired form and position of a noise patch, a target may be effectively obscured merely with low power. Moreover, unlike existing deceptive jamming, the jamming signal may be generated without securing a position of an SAR transmission antenna, resulting in low complexity for jamming signal calculation, and a noise patch in an arbitrary form may be generated without generating noise for a wide area in an SAR image, thereby enabling jamming for selectively a specific target.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A jamming signal generation method comprising:
- receiving a synthetic aperture radar (SAR) transmission signal collected by an SAR device for a target area;
- calculating a parameter comprising an angle of arrival (AOA) of the SAR transmission signal, based on the SAR transmission signal;
- determining a first form and a first position of a noise patch in a predefined coordinate system;
- transforming the predefined coordinate system into an SAR image formation plane (IFP) coordinate system, based on a coordinate system transformation function;
- determining a second form and a second position transformed from the first form and the first position of the noise patch in an SAR image generated based on the SAR transmission signal using the SAR IFP coordinate system;
- generating a first reflectivity map model, based on the second form and the second position of the noise patch;
- generating a second reflectivity map model of a frequency domain by performing two-dimensional (2D) fast Fourier transformation (FFT) on the first reflectivity map model; and
- generating an SAR jamming signal, based on a convolutional product of the second reflectivity map model and a reference signal.

2. The jamming signal generation method of claim 1, further comprising performing inverse FFT (IFFT) on the SAR jamming signal and transmitting the SAR jamming signal to the target area to generate the noise patch in the SAR image.

3. The jamming signal generation method of claim 1, wherein the determining of the first form and the first position of the noise patch in the predefined coordinate system comprises determining the first form and the first position of the noise patch by using coordinates of a corner of the noise patch in a north-east coordinate system.

4. The jamming signal generation method of claim 3, wherein the coordinate system transformation function indicated as CIN comprises a direction cosine matrix that transforms the noise patch from the first form and the first position in the north-east coordinate system to the second form and the second position in the SAR IFR coordinate system, and is defined as $$C^{I}{}_{N} = \begin{bmatrix} \cos\theta^{I}{}_{N} & -\sin\theta^{I}{}_{N} \\ \sin\theta^{I}{}_{N} & \cos\theta^{I}{}_{N} \end{bmatrix},$$

wherein Cambria Math indicates a rotation angle of the SAR IFP coordinate system based on the north-east coordinate system, and is calculated based on an angle of arrival (AOA) of the SAR transmission signal.

5. The jamming signal generation method of claim 4, wherein coordinates of the second position of the noise patch in the SAR IFP coordinate system is calculated using $[x^I\ y^I]^T = C^{IN}[x^N\ y^N]^T$, wherein $x^N$ and $y^N$ respectively indicate x-direction and y-direction coordinates of a corner of the noise patch in the north-east coordinate system, and $x^I$ and $y^I$ may respectively indicate x-direction and y-direction coordinates of the corner of the noise patch in the SAR IFP coordinate system.

6. The jamming signal generation method of claim 5, wherein the second reflectivity map model indicated as V(n, f) is calculated according to $V(n, f)=F\{a(x^I, y^I)\}$, wherein n indicates a pulse index of the second reflectivity map model, f indicates a pulse frequency of the second reflectivity map model, F(A) indicates a function that performs 2D FFT on A, and $a(x^I, y^I)$ indicates the first reflectivity map model.

7. The jamming signal generation method of claim 6, wherein the SAR jamming signal indicated as S(n, f) comprises a convolutional product of the second reflectivity map model and the reference signal, and is calculated according to $S(n, f)=U(n, f)V(n, f)$, wherein U(n, f) indicates the reference signal and comprises a waveform of an SAR signal in a frequency domain.

8. The jamming signal generation method of claim 1, wherein the parameter further comprises a center frequency of the SAR transmission signal, a transmission bandwidth of the SAR transmission signal, and a pulse repetition frequency of the SAR transmission signal.

9. A computer program stored on a recording medium to execute, on a computing device, the jamming signal generation method according to claim 1.

10. A jamming signal generation system comprising a noise patch configuration unit and a synthetic aperture radar (SAR) signal generation unit, wherein the noise patch configuration unit comprises:

an SAR signal reception unit configured to receive an SAR transmission signal collected by an SAR device for a target area;

a first determination unit configured to determine a first form and a first position of a noise patch in a predefined coordinate system;

a coordinate system transformation unit configured to transform the predefined coordinate system into an SAR image formation plane (IFP) coordinate system, based on a coordinate system transformation function; and a second determination unit configured to determine a second form and a second position transformed from the first form and the first position of the noise patch in an SAR image generated based on the SAR transmission signal using the SAR IFP coordinate system, and the SAR signal generation unit comprises:

a first reflectivity map model generation unit configured to generate a first reflectivity map model based on the second form and the second position of the noise patch;

a second reflectivity map model generation unit configured to generate a second reflectivity map model of a frequency domain by performing two-dimensional (2D) fast Fourier transformation (FFT) on the first reflectivity map model; and an SAR jamming signal generation unit configured to generate an SAR jamming signal based on a convolutional product of the second reflectivity map model and a reference signal.

11. The jamming signal generation system of claim 10, wherein the SAR signal generation unit further comprises a noise patch generation unit configured to perform inverse FFT (IFFT) on the SAR jamming signal and transmit the SAR jamming signal to the target area to generate the noise patch in the SAR image.

12. The jamming signal generation system of claim 10, wherein the first determination unit is further configured to determine the first form and the first position of the noise patch by using coordinates of a corner of the noise patch in a north-east coordinate system.

13. The jamming signal generation system of claim 10, wherein the noise patch configuration unit further comprises a parameter calculation unit configured to calculate a parameter comprising an angle of arrival (AOA) of the SAR transmission signal, based on the SAR transmission signal.

* * * * *